Nov. 11, 1924.  1,515,424
L. F. STAFFORD
BUMPER AND ATTACHING MEANS THEREFOR
Filed Sept. 28, 1922   2 Sheets-Sheet 2
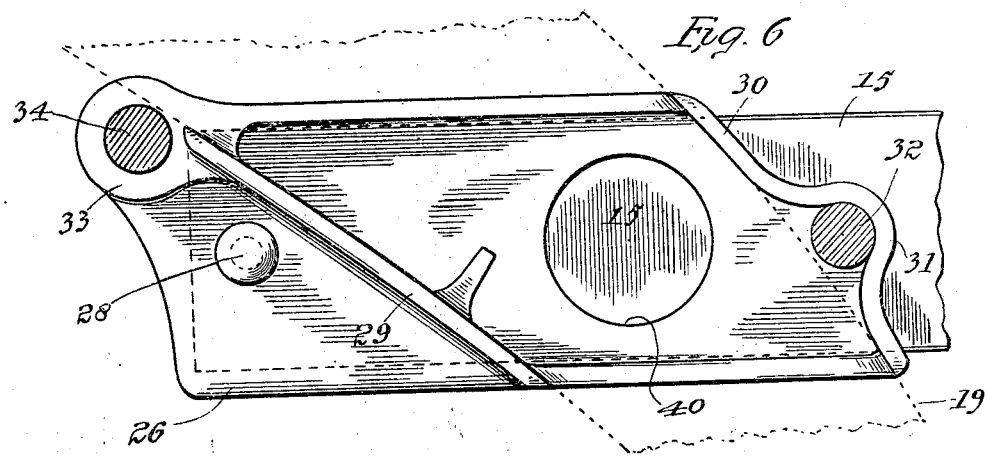
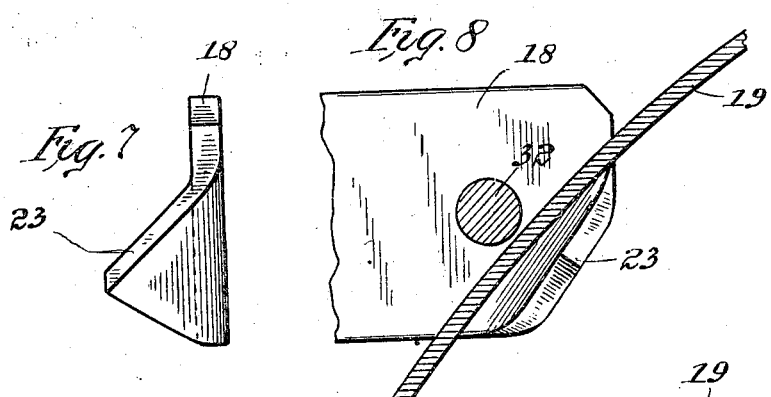
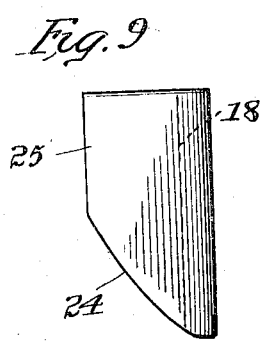
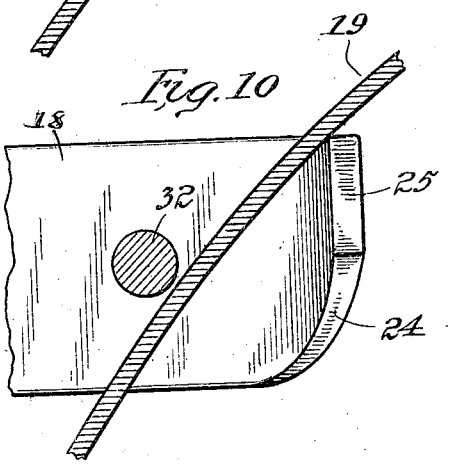
Inventor:
Lewis F. Stafford
By Benjamin, Roodhouse & Lundy.
Attys.

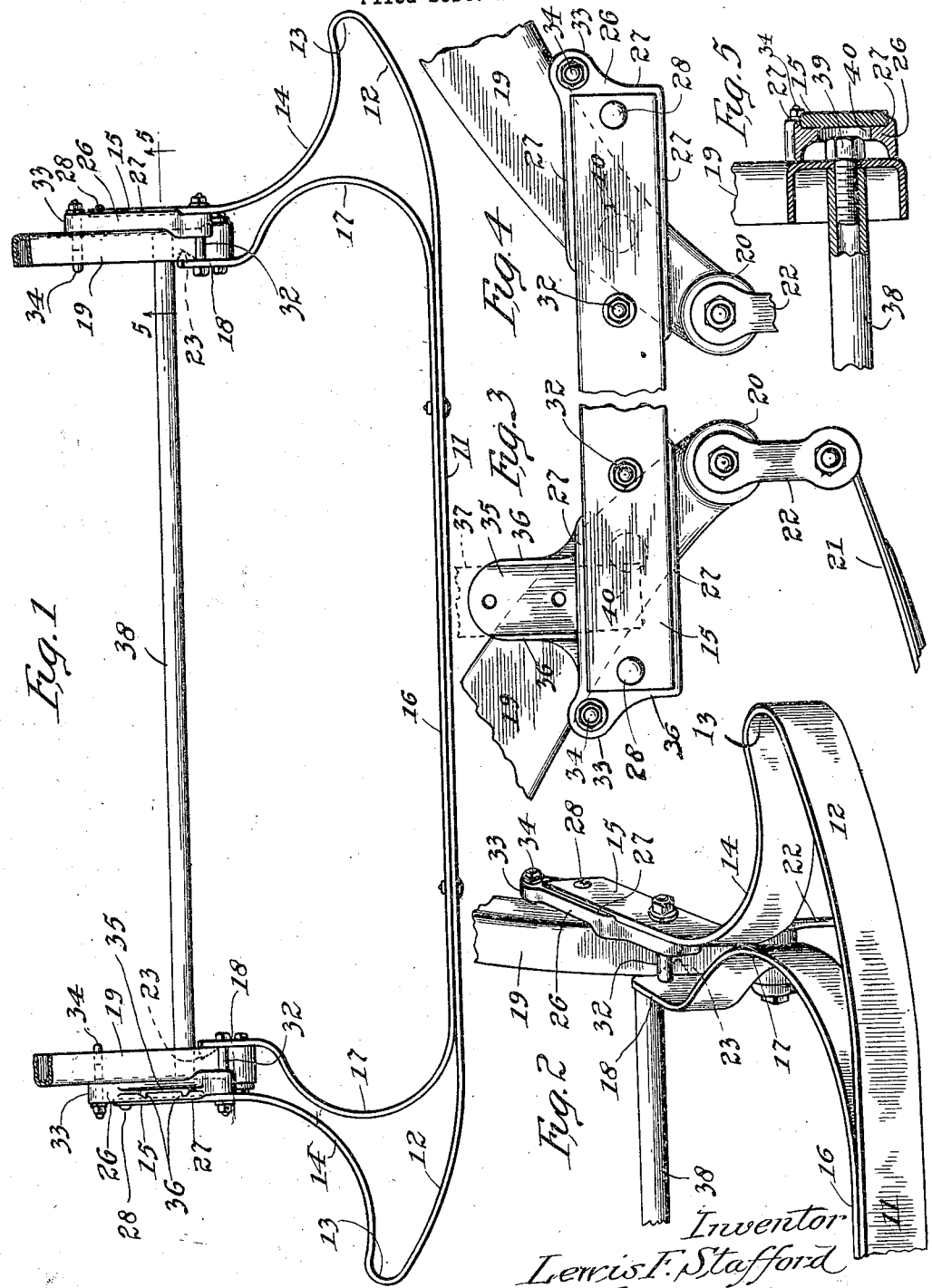

Patented Nov. 11, 1924.

1,515,424

UNITED STATES PATENT OFFICE.

LEWIS F. STAFFORD, OF CHICAGO, ILLINOIS, ASSIGNOR TO STAFFORD SPRING GUARD COMPANY, OF CHICAGO, ILLINOIS, A CORPORATION OF ILLINOIS.

BUMPER AND ATTACHING MEANS THEREFOR.

Application filed September 28, 1922. Serial No. 591,074.

*To all whom it may concern:*

Be it known that I, LEWIS F. STAFFORD, a citizen of the United States, residing at Chicago, county of Cook, and State of Illinois, have invented certain new and useful Improvements in Bumpers and Attaching Means Therefor, of which the following is a specification.

My invention relates to bumpers for motor vehicles, and has more particular reference to the structures that extend from the impact receiving element to the chassis of the vehicle, and the means for attaching the same thereto.

My present invention has for its principal object the provision of a bumper and attaching brackets therefor that are constructed so that they may be readily attached to motor vehicles of several types, without the necessity for removing or altering parts of the vehicle. Other objects reside in the provision of a bumper and attaching bracket that is rigid in construction as relates to its attachment to the vehicle so that the main impact member and the auxiliary or inner bumper structure may be mounted quickly and without use of special tools. The fabrication of a bumper and attaching means in this manner permits of a single pattern or casting for the attaching brackets to be used on divers vehicles, and thereby reduces the cost of manufacture so that the article may be sold for a moderate price. I have also provided means whereby the usual bracket for supporting the tail light and the license plate may be detached from the chassis of the vehicle and mounted by means of the bumper attaching bracket.

I prefer to carry out my invention in substantially the manner hereinafter described, and as more particularly pointed out in the claims, reference will now be had to the accompanying drawings which show a typical or preferred embodiment of my invention, in which drawings—

Fig. 1 is a top plan of my bumper and attaching brackets secured to the rear horns of a motor vehicle chassis.

Fig. 2 is a perspective of a fragmentary portion of the structure illustrated in Fig. 1, at the right hand end thereof.

Fig. 3 is a vertical side elevation of the attaching bracket for the left side of the vehicle chassis.

Fig. 4 is a similar view of the bracket for the right side of the vehicle chassis.

Fig. 5 is a vertical section taken on line 5—5, Fig. 1.

Fig. 6 is an enlarged view of one of the attaching brackets removed from the chassis with the horn shown in dotted lines.

Figs. 7 and 8 are, respectively, an end view and a side elevation, enlarged, showing the end of the arm of the inner bumper member with its deflected portions.

Figs. 9 and 10 are similar views showing a modified deflected end of the inner bumper arm.

Similar reference characters designate like parts wherever they occur throughout the views.

The bumper structure comprises an outer impact member 11 that extends across the end of the vehicle, and at its ends is bowed slightly, as at 12, and then provided with hair pin turns 13 from which extend wide inward curves 14 that terminate in the elongated arms 15 extending alongside the vehicle chassis. A reinforcing or auxiliary bumper structure is disposed within the bumper structure above described and comprises a straight stretch 16 disposed parallel with the straight portion 11 of the main bumper structure, and which is then provided with substantially semi-circular portions 17 that terminate in short bends and then extend at right angles to the front portion 16 to provide attaching arms 18 that parallel the arms 15 of the main or outer bumper structure.

The horns 19 of the vehicle chassis are usually of channel shape, as shown in the drawings, and terminate in transverse bearings 20 to which the springs 21 are connected by shackles 22. The web of the channel is usually vertical, and the channels of the horns open centrally or towards each other. I have, in order to obtain rigidity to the connection of arms 18 of the inner bumper with the channel of the chassis horn, provided the ends of these arms with lateral or transverse elements that engage the upper flange of the channel. In Figs. 7 and 8 I have shown this lateral member to comprise a projecting portion formed by bending the lower corner of the metal strap forming the bumper arm laterally, as indicated at 23. The line of the bend is preferably oblique and extends from the end edge of the metal downwardly to the bottom edge. Another manner of accomplishing the above function is to shear the end of the bumper strap obliquely so as to remove the lower corner, as at 24, in Figs. 9 and 10 of the drawings. The upper remaining portion of arm 18 is curved inwardly to provide what might be termed a lug 25 that extends under the upper flange of the channel of the chassis horn.

The bracket for securing the outer arm of the main bumper structure to the vehicle comprises a casting consisting of an elongated plate 26 that is provided upon its outer face with a rib 27 extending along its upper and lower longitudinal edges and along one of its end edges. This provides a pocket or seat in which rear straight arm 15 of the main bumper structure is mounted, and which is secured adjacent its end in said pocket by means of a rivet, bolt, or the like, 28. The opposite face of plate 26 is provided with an oblique or diagonal channel to receive the chassis horn; said channel being formed by providing the plate with outwardly extending ribs 29 and 30 that are spaced apart a distance and of the desired shape to receive the web of the channel. The rib 30 is provided with an offset portion 31 and a bolt 32 passes through an aperture made in the plate and through bumper arm 15, and is disposed above the top flange of channel 19, the opposite end of the bolt being engaged with short arm 18 of the inner bumper member. When the nut on bolt 32 is tightened bracket 26 will be drawn tight against the horn of the chassis and arm 18 of the inner bumper member will be drawn against the top edge of the top flange of channel 19 with its offset lateral member 23 (or 25) positioned just below the top flange of said channel.

An ear 33 is formed at the end of bracket plate 26 and is bored to receive a hook-shaped bolt 34 that passes therethrough and has its hooked end engaged with the lower flange of channel 19 on the chassis horn. By tightening the nut of hook-shaped bolt 34 the adjacent portion of bracket plate 26 is drawn tightly against the channel 19 and the bumper structure has been secured in position.

The bracket plate 26 that is employed to secure the left hand arm of the bumper to the rear of the chassis is provided with an upstanding extension 35 having ribs 36 extending upon its vertical side edges to receive the lower portion 37 of a tail light bracket or license plate bracket, which is usually standard equipment upon a motor vehicle, and which should be removed from the chassis horn and attached to the bracket plate extension 35 prior to mounting the bumper upon the chassis, and the lower portion 37 of the tail light bracket will extend upon the outer face of bumper arm 15, as seen in dotted lines in Fig. 3.

In certain types of motor vehicles the chassis horns are reinforced and tied together adjacent their outer ends by a crossbar 38 that has its ends abutting the web of channel 19 between the flanges thereof and secured in position by a headed bolt 39 that passes through an aperture in the web of the channel. The disposition of the head of bolt 39 frequently prevents the positioning of the bumper bracket plate 26 in the manner desired, and I have therefore provided said plate with a recess or aperture 40 (Fig. 5) to accommodate such a structure.

What I claim is:—

1. A bumper structure comprising inner and outer impact members, spring arms at the ends thereof extending toward the vehicle, and brackets whereby the bumper is mounted upon the vehicle, said brackets each consisting of a substantially flat plate the opposite faces thereof being of channel section and the channel upon one face disposed oblique to the channel upon the opposite face whereby a bumper arm and a sill of the chassis are engaged by said plate in fixed relation to each other.

2. A bumper structure comprising an inner and an outer impact member, spring arms extending from the ends of each member toward the vehicle, and brackets whereby the bumper is mounted upon the vehicle, said brackets each consisting of a plate having a pocket upon one face to receive a bumper arm and having its opposite face provided with a channel to fit the flanges of the side-sill of the vehicle chassis.

3. A bumper structure comprising an impact member, spring arms extending from opposite ends of the impact member toward the vehicle, and brackets connected to the ends of said arms and to the vehicle, said brackets each consisting of an elongated plate having ribs extending from one face along the longitudinal edges and one end edge to provide a pocket to receive the end portion of a bumper arm, and obliquely disposed spaced ribs upon the opposite face of said plate for engagement with the flanges and web of the sill of the vehicle chassis.

4. The combination with the side-sill of a vehicle chassis said sill being of channel section with its web vertical, of a bumper attaching bracket comprising an elongated plate the outer face of which is adapted to receive an end of a bumper arm, and the opposite face of said plate is provided with obliquely disposed lateral ribs spaced to fit the upper and lower flanges of the chassis sill and position the face against the vertical web of said sill.

5. The combination with a vehicle chassis having longitudinal side members of channel section, and a bumper secured to said members, of an auxiliary bumper structure comprising an impact member extending across the end of the chassis, spring arms projecting laterally at the ends of said impact member toward the chassis; said impact member and arms formed of strap metal disposed upon edge, the ends of said arms being bent laterally and the lateral portions thereof extended into the channel of the chassis side members between the flanges of said channel, and means for securing said arms to the chassis.

6. A bumper attaching bracket comprising a plate one face thereof being provided with an open pocket in which a bumper arm is adapted to be mounted and the opposite face of said plate having spaced oblique ribs that converge slightly towards each other to fit and receive the flanges and web of a channel side-sill of a vehicle chassis.

Signed at Chicago, county of Cook and State of Illinois, this 12th day of August, 1922.

LEWIS F. STAFFORD.